United States Patent [19]

Takizawa et al.

[11] Patent Number: 4,464,743
[45] Date of Patent: Aug. 7, 1984

[54] RECORD PLAYING APPARATUS

[75] Inventors: Kazuyuki Takizawa, Kobayashi; Takao Izumi, Tokyo; Makoto Kodama, Yokohama, all of Japan

[73] Assignee: Sony Corporation, Tokyo, Japan

[21] Appl. No.: 548,031

[22] Filed: Nov. 2, 1983

Related U.S. Application Data

[63] Continuation of Ser. No. 323,458, Nov. 20, 1981, abandoned.

[30] Foreign Application Priority Data

Nov. 28, 1980 [JP] Japan ................. 55-166624
Dec. 12, 1980 [JP] Japan ................. 55-177548[U]

[51] Int. Cl.³ .................................. G11B 1/00
[52] U.S. Cl. .................................... 369/75.2
[58] Field of Search .............. 369/75.1, 75.2, 77.1

[56] References Cited

U.S. PATENT DOCUMENTS

| 2,358,917 | 9/1944 | Emde | 312/8 |
| 2,608,456 | 8/1952 | Barth | 312/8 |

FOREIGN PATENT DOCUMENTS

| 0040880 | 12/1981 | European Pat. Off. | 369/75 |
| 2351628 | 12/1977 | France | 312/9 |

Primary Examiner—S. Clement Swisher
Assistant Examiner—Hezron Williams
Attorney, Agent, or Firm—Lewis H. Eslinger; Alvin Sinderbrand

[57] ABSTRACT

Record playing apparatus includes a housing having an opening at its front end; a record carrier assembly having a turntable for supporting a record disc and a tone arm assembly for reproducing signals from the disc; guide rollers which support the record carrier assembly for horizontal movement through the opening between a first position within the housing and a second position withdrawn from the housing; a dust cover; a pair of elongated arms pivotally mounted at one end thereof to opposing sides of the record carrier assembly and having the dust cover connected to the free ends thereof; springs for biasing the arms to move the dust cover to a first cover position in blocking relation to the opening when the record carrier assembly is moved to its first position; and cam bars for biasing the arms against the force of the springs when the record carrier assembly is moved to its second position so as to move the dust cover out of the aforementioned blocking relation and into a slot formed in a mounting frame secured to the front end of the record carrier assembly.

19 Claims, 6 Drawing Figures

FIG. 5

RECORD PLAYING APPARATUS

This is a continuation of application Ser. No. 06/323,458, filed Nov. 20, 1981, now abandoned.

BACKGROUND OF THE INVENTION

1. Field of the Invention

This invention relates generally to record playing apparatus and, more particularly, is directed to a record playing apparatus which is adapted to perform a record changing operation within a relatively small space.

2. Description of the Prior Art

Conventional record playing apparatus generally include a dust cover which is pivotally mounted to the housing of the record playing apparatus. When performing a record changing operation, the dust cover is pivoted to an open position, and is closed during all other times to prevent dust accumulation on the turntable and other parts of the apparatus. Because of the pivotally mounted arrangement of the dust cover, additional space, in the heightwise or vertical direction is required to pivot the dust cover to its open position during the record changing operation, that is, when removing a record disc from the turntable and/or placing a new record disc on the turntable. This arrangement, of course, is undesirable when the apparatus is supported within a small confine. However, if the dust cover is eliminated from the apparatus so as to avoid this problem, dust will be deposited on the turntable and other parts of the apparatus. In such case, damage can result to the apparatus and the record disc and the quality of the signals reproduced from the record disc, for example, by the phonographic stylus, will deteriorate.

A dust-proof record playing apparatus has been proposed in which a record disc is inserted into the front of a substantially closed housing. The record disc is then automatically loaded and unloaded with respect to a playback position in the apparatus. Since this apparatus does not include a dust cover, it thereby overcomes the aforementioned difficulty. However, although this record playing apparatus has a dust-proof construction to prevent the accumulation of dust on the turntable and other parts of the apparatus, it is impossible to manually select a desired musical selection through manual operation of the tone arm. It is also extremely difficult to perform any internal maintenance on this apparatus. Further, because of the nature of this apparatus, it is extremely difficult to provide an amplifier and the like directly on the apparatus.

OBJECTS AND SUMMARY OF THE INVENTION

Accordingly, it is an object of this invention to provide a record playing apparatus that avoids the above-described difficulties encountered with the prior art.

More particularly, it is an object of this invention to provide a record playing apparatus with which a record changing operation can be performed when the apparatus is supported in a relatively small confine.

It is another object of this invention to provide a record playing apparatus having a record carrier assembly that is adapted to move in a horizontal direction between a first position retracted into the apparatus and a second position withdrawn from the apparatus.

It is still another object of this invention to provide a record playing apparatus, as aforementioned, having a novel dust cover assembly for preventing the depostion of dust on the turntable of the apparatus when the record carrier assembly is positioned within the apparatus, while permitting a record changing operation to be performed when the record carrier assembly is withdrawn from the apparatus.

It is yet another object of this invention to provide a record playing apparatus which can be manually operated to select a desired musical selection on a record disc for reproduction.

It is a further object of this invention to provide a record playing apparatus that is adapted to have an amplifier and other assemblies built into it.

It is a still further object of this invention to provide a record playing apparatus with which internal maintenance can be easily performed.

In accordance with an aspect of this invention, a record playing apparatus includes housing means having an opening; record carrier means for supporting a record disc, the record carrier means being adapted to move between a first carrier position within the housing means and a second carrier position withdrawn from the housing means; cover means; and control means for moving the cover means to a first cover position in a blocking relation to the opening when the record carrier means is moved to the first carrier position, and to a second cover position out of the blocking relation with the opening when the record carrier means is moved to the second carrier position.

The above, and other, objects, features and advantages of the invention will be apparent in the following detailed description of an illustrative embodiment of the invention which is to be read in connection with the accompanying drawings.

DETAILED DESCRIPTION OF A PREFERRED EMBODIMENT

Figure 1:
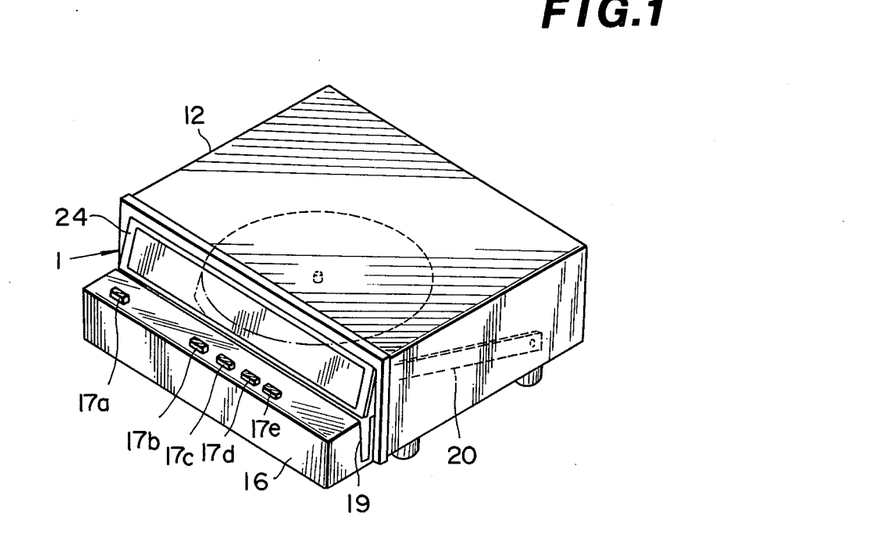
FIG. 1 is a perspective view of a record playing apparatus according to one embodiment of this invention, with the record carrier assembly being positioned within the apparatus housing.
Figure 6:
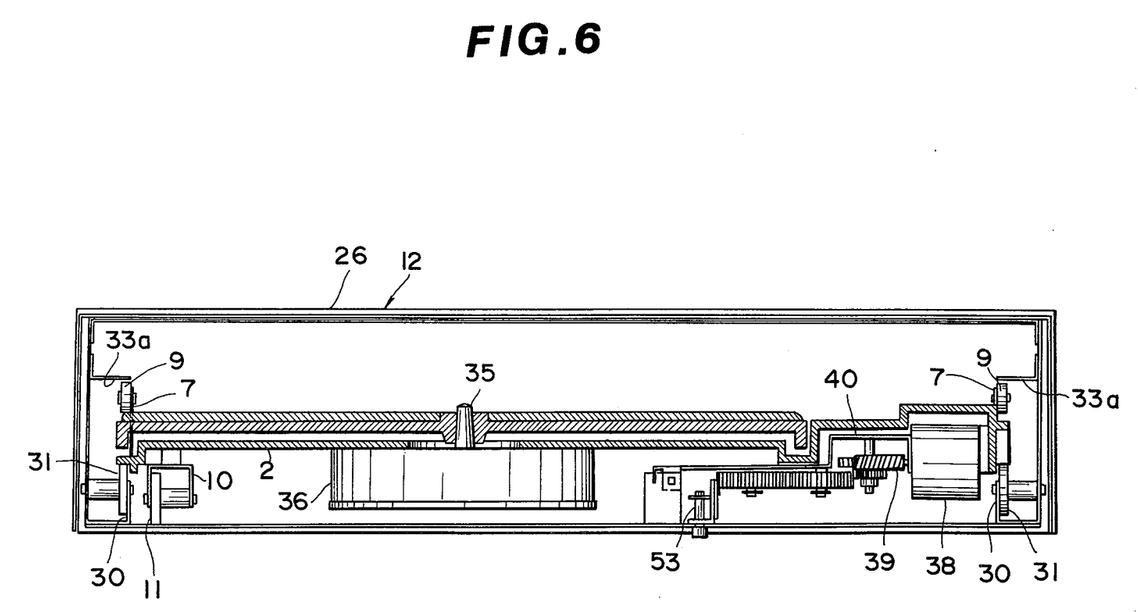
FIG. 6 is a partial cross-sectional, partial elevational view of a portion of the apparatus of FIG. 2.

Referring to the drawings in detail, and initially to FIG. 1 thereof, a record playing apparatus according to one embodiment of this invention includes a casing or housing 12 formed from a top wall 26, a bottom wall 27 and three side walls 28, with the remaining side of the apparatus at the front end thereof being open. A record carrier assembly 1 is disposed within housing 12 in a first retracted position in FIG. 1 and, as shown more particularly in FIGS. 3, 4 and 6, record carrier assembly 1 includes a player board 2 on which a rotatable turntable 6 is mounted. As shown in FIG. 6, turntable 6 is centrally mounted on a center spindle 35, and a turntable motor 36 secured to the underside of player board 2 rotates spindle 35 during the reproducing operation so that spindle 35, in turn, rotates turntable 6. A tone arm 4 is also pivotally mounted at one end thereof to player board 2 and has a record playing cartridge 3 at its free end which is adapted to reproduce signals recorded on a record disc 5 as the latter is rotated by turntable 6.

Figure 2:
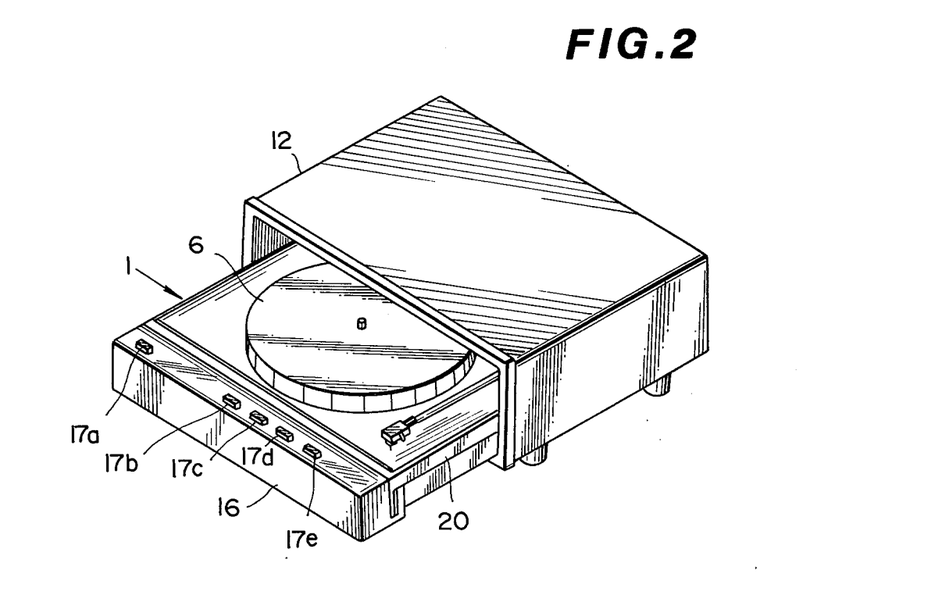
FIG. 2 is a perspective view of the record playing apparatus of FIG. 1, with the record carrier assembly being withdrawn from the apparatus housing.
Figure 3:
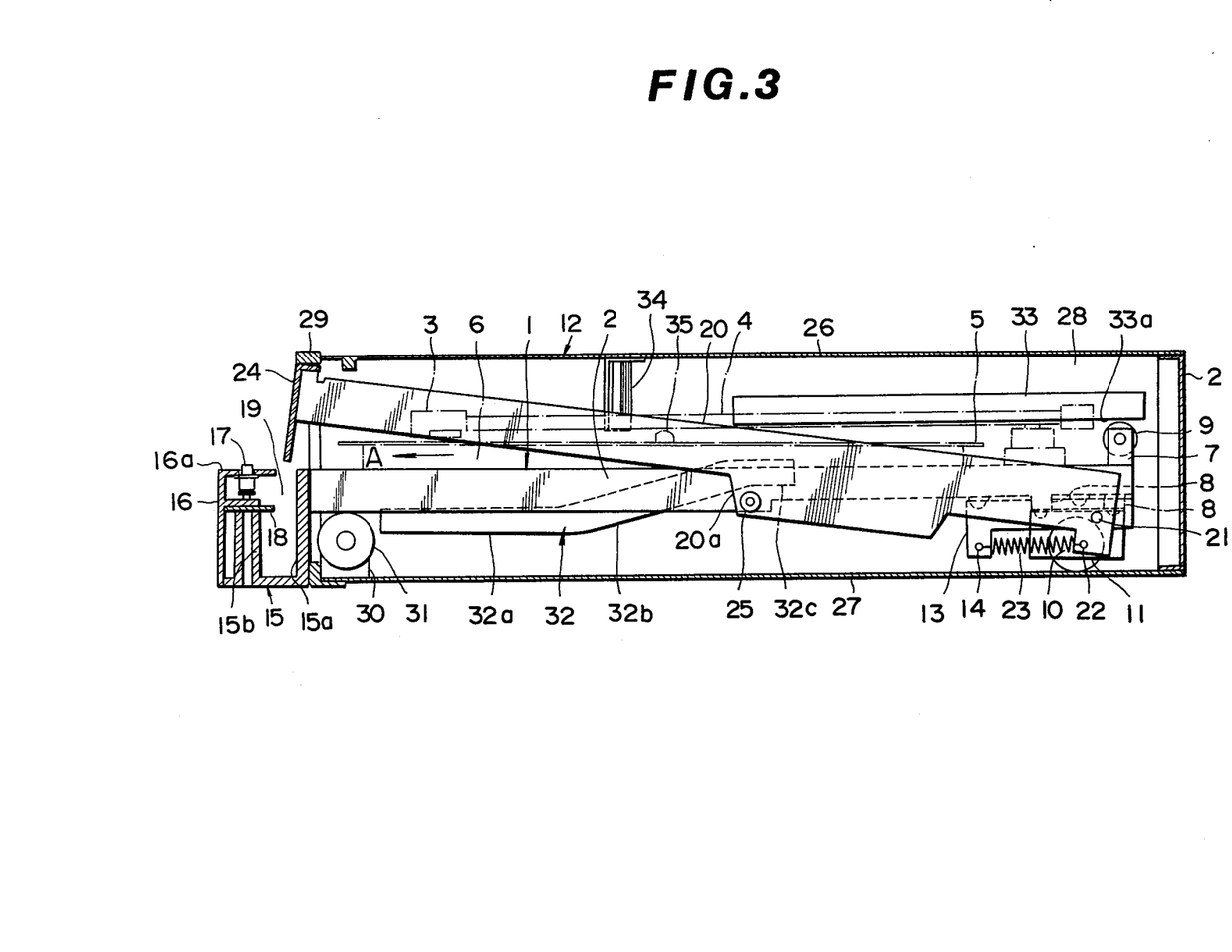
FIG. 3 is a partial cross-sectional, partial side elevational view of a portion of the apparatus of FIG. 1.
Figure 4:
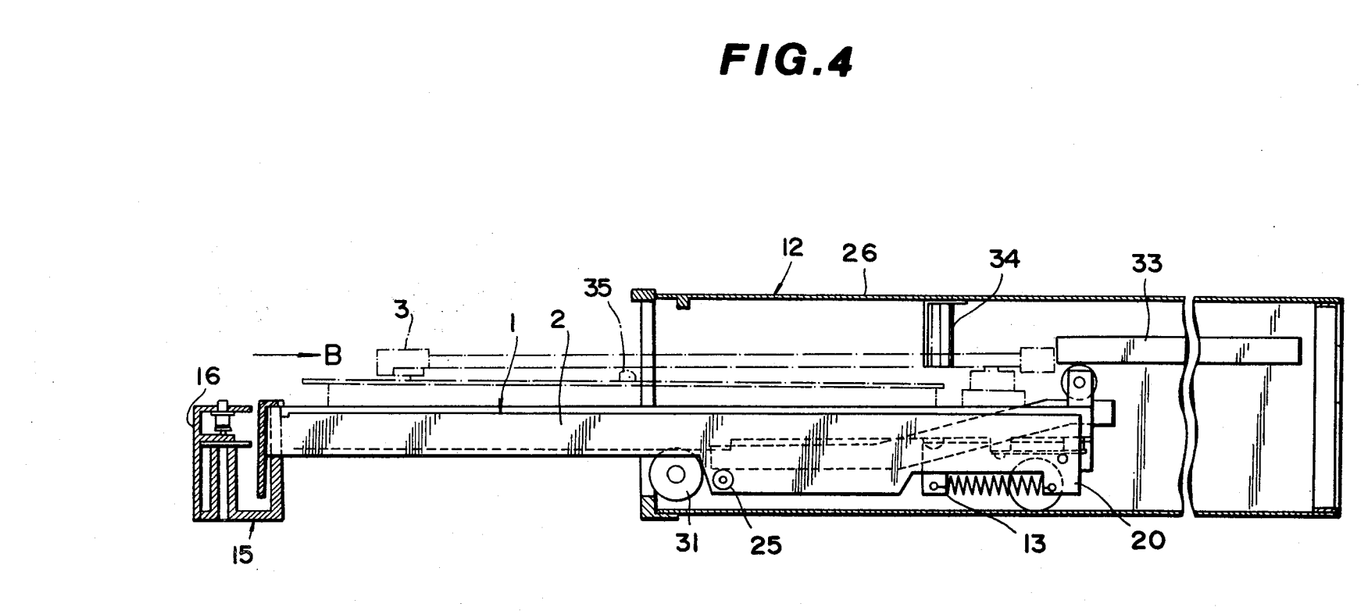
FIG. 4 is a partial cross-sectional, partial side elevational view of a portion of the apparatus of FIG. 2.

In accordance with the present invention, carrier assembly 1 is adapted to move between a first retracted position, as shown in FIGS. 1 and 3, and a second withdrawn position, as shown in FIGS. 2 and 4, in order to perform a record changing operation. In this regard, the rear end of player board at opposite sides thereof includes downwardly extending projections 8, which, in turn, support brackets 10 on each side of the player board, as shown in FIG. 3. Brackets 10, in turn, rotatably support guide rollers 11 which rotationally communicate with the bottom wall 27 of housing 12. In addition, a pair of brackets 30 are secured to bottom wall 27 at the front end of the apparatus on opposite sides of player board 2. Each bracket 30 has a guide roller 31 rotatably mounted thereon for supporting the opposite edges of player board 2 at the underside thereof. In this manner, carrier assembly 1 and player board 2 thereof are adapted to move in the horizontal direction between the first retracted position shown in FIG. 3 and the second withdrawn position shown in FIG. 4 as the latter rolls on guide rollers 11 and 31. Further, as shown in FIGS. 3, 4 and 6, two upright side brackets 7 are secured to the rear end of player board 2 at opposite sides thereof and, in turn, carry rotatable guide rollers 9. Guide rails 33 are secured to the inner side walls 28 of housing 12 on opposite sides of carrier assembly 1, each having a horizontal lower edge 33a for guiding a respective one of rollers 9 during the aforementioned horizontal movement of carrier assembly 1 to restrict any vertical displacement of player board 2 at such time.

A mounting frame 15 is secured to the front end of player board 2 and, in particular, includes an upright member 15a directly secured to the front of player board 2, and an upright section 15b connected to member 15a such that a groove or slot 19 is formed between upright member 15a and upright section 15b, as shown in FIG. 3. A lower panel 16 which may, for example, be an inverted L-shaped metal plate is connected to the front of mounting frame 15 such that the opening for slot 19 is defined between an upper member 16a of lower panel 16 and the upper end of upright member 15a. Further, a plurality of switches 17a–17e, which are referred to generically in FIG. 3 by the numeral 17, are provided in upper member 16a for controlling the various operations of the record playing apparatus, and a printed circuit board 18 which carries switch circuits and the like is mounted to the upper end of upright section 15b in an opposing relation to switches 17a–17e. The separation between printed circuit board 18 and upright member 15a also functions to define slot 19. As will be discussed in more detail hereinafter, slot 19 is adapted to cooperate with a dust cover or cover plate 24 such that the latter is positioned within slot 19 when record carrier assembly 1 is moved to its second withdrawn position, as shown in FIG. 2. Lamps may also be provided on upper member 16a for determining which of the switches 17a–17e has been activated.

For controlling the position of dust cover 24, two elongated arms 20 are provided on opposite sides of player board 2. More particularly, one end of each arm 20 is pivotally mounted by a pivot pin 21 on a respective one of the brackets 10 at the rear of player board 2, as shown in FIGS. 3 and 4. Each arm 20 has a spring anchoring aperture 22 at its pivoted end, and a mounting member 13 secured to the rear end of player board 2 at opposite sides thereof is formed with respective spring anchoring apertures 14. In this manner, a coil spring 23 is connected between each aperture 14 and its corresponding aperture 22 and functions to bias each respective arm 20 in the clockwise direction, as viewed in FIGS. 3 and 4 about its respective pivot pin 21. The aforementioned dust cover or cover plate 24, which is shown in an inverted L-shaped configuration, is secured to the free ends of arms 20. Thus, when arms 20 are biased in the clockwise direction, as viewed in FIG. 3, the upper end of dust cover 24 abuts against a decorative frame member 29 secured to the front or open end of top wall 26 of housing 12. Accordingly, elongated arms 20 are limited in their clockwise angular rotation. It is to be appreciated that, in this latter position, as shown in FIGS. 1 and 3, dust cover 24 blocks the opening to the apparatus at the front end thereof to prevent dust and the like from entering and interfering with the operation thereof. In such position, the lower end of dust cover 24 is positioned at the upper end or opening of the aforementioned slot 19 formed between upper member 16a of lower panel 16 and the upper end of upright member 15a. In addition, as will be described in more detail hereinafter, a cam follower in the form of a roller 25 is mounted on an outwardly projecting pin approximately midway on each arm 20, adjacent a stop portion 20a on each arm.

As shown in FIG. 3, cam bars 32 are secured to side walls 28 of housing 12 at opposite sides of player board 2, each cam bar including a horizontal forward portion 32a extending from the front end of housing 12 and terminating in an upwardly inclined portion 32b which, in turn, terminates in a horizontal rear portion 32c. Cam bars 32 are adapted to guide the respective guide rollers 25 of arms 20. In particular, when player board 2 is moved from its first retracted position, as shown in FIG. 3, to its second withdrawn position, as shown in FIG. 4, arms 20 are moved along therewith. Accordingly, guide rollers 25 are guided along the underside of cam bars 32 so that arms 20 are biased in the counter-clockwise direction against the action of springs 23. In this manner, when player board 2 is moved to its second withdrawn position, as shown in FIG. 4, arms 20 are horizontally arranged and dust cover 24, which is secured to the free ends of arms 20, is positioned out of the way in slot 19. A record disc positioning member 34 also extends downwardly from the inner portion of top wall 26 for aiding the user in positioning a record disc 5 on turntable 6 when record carrier assembly 1 is moved to its second withdrawn position.

Figure 5:
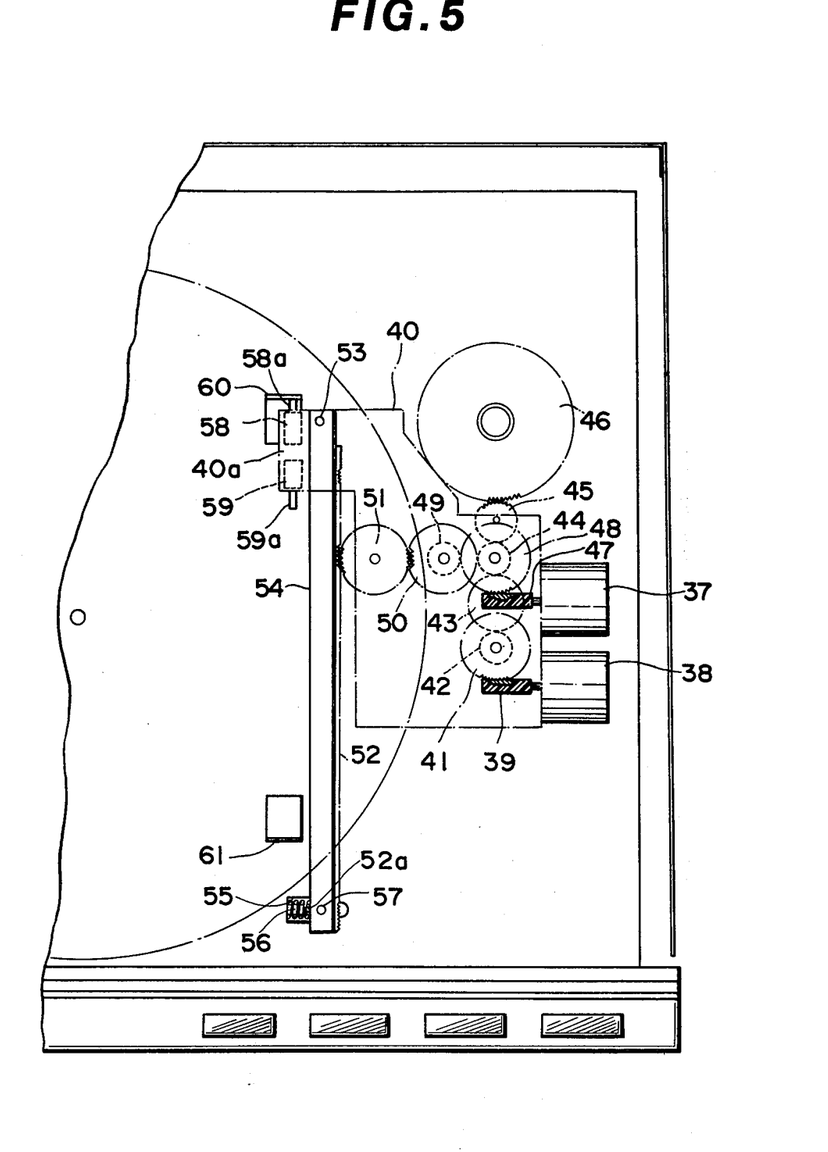
FIG. 5 is a top-plan view, partially in phantom, of a portion of the apparatus of FIG. 1.

Referring now to FIG. 5, there is shown an arrangement for moving carrier assembly 1 and player board 2 between the first retracted position and second withdrawn position with respect to housing 12. In particular, a motor 37 is provided with a worm gear 47 secured to its output shaft. Worm gear 47 is coupled through a gear train comprised of gears 48, 49, 50 and 51 mounted on a gear mounting plate 40, to a guide rack 52. Gear mounting plate 40 is attached to the underside of player board 2 for movement therewith, and the guide rack 52 is secured to the right edge face of a lever 54 which is pivotally mounted at one end thereof by means of a pivot pin 53 to a rear portion of bottom wall 27. Lever 54, and therefore, guide rack 52, are normally biased in the counter-clockwise direction, as viewed in FIG. 5, by a spring 56 connected between one end of a spring anchoring aperture 55 formed in bottom wall 27 and a projection 52a connected to the left edge face of lever 54. In this manner, the engaging teeth of guide rack 52 are normally biased into meshing engagement with gear 51 of the aforementioned gear train. The free end of lever 54 also includes an operating pin 57 which extends through spring anchoring aperture 55 and which is used for manual operation of the apparatus, as will be discussed in greater detail hereinafter.

As shown in FIG. 5, two switches 58 and 59 having respective extended operating members 58a and 59a, which face in opposite directions, are provided on an extended portion 40a of mounting plate 40. Operating members 58a and 59a are adapted to cooperate with actuating members 60 and 61, respectively, which project from the rear and front portions of bottom wall 27. Thus, when player board 2 is in its first retracted position, actuating member 60 engages operating member 58a of switch 58 to detect such position, while actuating member 61 cooperates with operating member 59a of switch 59 when player board 2 is in its second withdrawn position to detect that position.

A motor 38 for operating tone arm 4 is also provided on mounting plate 40 in a side-by-side relation to motor 37 and includes a worm gear 39 secured to its output shaft. Worm gear 39 cooperates with a gear 46 secured to an arm shaft of the tone arm, through a gear train comprised of gears 41–45 mounted on gear mounting plate 40, to control movement of the tone arm.

In operation, prior to the start of the playback or reproducing operation, carrier assembly 1 is positioned within housing 12 in its first retracted position. At this time, dust cover 24 which is supported at the free ends of arms 20 is positioned in a blocking relation to the opening of housing 12 between decorative frame 29 and the upper end of slot 19, thereby preventing dust and the like from being introduced into the interior of housing 12 and interrupting or deteriorating the reproducing operation. To initiate the playback operation, switch 17a is depressed. This activates motor 37 to cause rotation of gear 51 through worm gear 47 and the gear train comprised of gears 48–50. As gear 51 is rotated, it advances along guide rack 52, thereby moving carrier assembly 1 from its first retracted position to its second withdrawn position. When the operating member 59a of switch 59 strikes actuating member 61, the current supply to motor 37 is interrupted, whereby carrier assembly 1, and player board 2 thereof, are maintained in the second position withdrawn from housing 12.

During the advancement of carrier assembly 1, elongated arms 20 are also advanced therewith. During such advancement to the withdrawn position, guide rollers 25 of arms 20 are guided by cam bars 32, whereby arms 20 are rotated in the counter-clockwise direction, from the position shown in FIG. 3 to that shown in FIG. 4. When guide rollers 25 are guided by the horizontal forward portions 32a of cam bars 32, dust cover is positioned within slot 19. Further, the extent of withdrawal of carrier assembly 1 is restricted by the stop portion 20a on each arm 20, which abuts against a respective roller 31. Also, during the withdrawal operation, rollers 9 cooperate with guide rails 33 to prevent any vertical displacement of player board 2.

It is to be appreciated that, when carrier assembly 1 is in its second withdrawn position, as shown in FIG. 4, center spindle 35 of turntable 6 is positioned in the proximity of decorative frame 29 while dust cover 24 is positioned within slot 19. In other words, no obstacles are present to prevent the removal of a record disc 5 from turntable 6 or the placement of a record disc 5 on turntable 6, for example, by moving the record disc in the direction of arrow B of FIG. 4 onto the turntable.

After a record disc 5 has been positioned on turntable 6 for reproduction, switch 17b is depressed, whereby motor 37 is activated to rotate in the opposite or reverse direction. In this manner, motor 37, through worm gear 47, the gear train comprised of gears 48–50, gear 51 and guide rack 52, causes carrier assembly 1 to be moved from its second withdrawn position to its first retracted position into housing 12, as shown in FIG. 3. When operating member 58a of switch 58 contacts actuating member 60, the current supply to motor 37 is interrupted, whereby the reverse movement of carrier assembly 1 is stopped. It is to be appreciated that, during such reverse movement of carrier assembly 1, guide rollers 25 of arms 20 are guided along cam bars 32, whereby arms 20 are caused to rotate in the clockwise direction, as viewed in FIG. 3, by means of springs 23. However, the extent of such clockwise rotation is limited by the abutment of dust cover 24 at the free ends of arms 20 against decorative frame 29.

Thereafter, switch 17c is depressed for initiating the reproduction operation. In particular, after switch 17c has been depressed, turntable motor 36 is activated to rotate center spindle 35 and thereby turntable 6 secured thereto. Further, the depression of switch 17c also provides for the activation of tone arm motor 38. Accordingly, tone arm motor 38, through worm gear 39, the gear train comprised of gears 41–45 and gear 46 causes tone arm 4 to be led from its rest position toward the outermost circumferential groove on record disc 5. When this lead-in operation has been completed, the meshing relation between gears 45 and 46 is released, for example, by means of a notch provided in one of the gears, such that the stylus of cartridge 3 at the free end of tone arm 4 rides within the spiral grooves of the record disc for reproducing signals recorded therein in a conventional manner. A circuit (not shown) is provided for detecting when the playback operation is completed, that is, when tone arm 4 is positioned within the innermost groove of the record disc and, in turn, activates a mechanism for lifting the tone arm from the record disc and then activates motor 38 for returning tone arm 4 to its rest position. After tone arm 4 has been returned to its rest position, motor 38 is deactivated to complete the reproducing operation.

It is to be appreciated that the present invention may also be utilized in a manual operation, for example, where it is desired to select a predetermined musical arrangement on the record disc. In such case, operating pin 57 is biased to the left in FIG. 5 against the biasing force of spring 56. This can be accomplished by means of any suitable mechanical or electro-mechanical arrangement. This, in turn, causes lever 54 to be rotated in the clockwise direction, as viewed in FIG. 5, about pivot pin 53 such that guide rack 52 is brought out of meshing engagement with gear 51. In this manner, carrier assembly 1 can be manually withdrawn from housing 12. The reproducing operation can then be performed with carrier assembly 1 withdrawn from housing 12.

It is to be appreciated that the present invention provides distinct advantages over the prior art. In particular, the present invention is adapted to be utilized in an extremely small confine such that the space necessary for performing the record changing and reproducing operations is minimized. With such arrangement, a dust cover is still provided for preventing dust and the like from entering the housing with the dust cover being automatically removed to a non-obstructing or non-blocking position during the record changing operation. It is also possible to provide manual operation of the present invention. Further, an amplifier and other assemblies may be installed directly in the apparatus.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Record playing apparatus comprising:
   housing means having an opening;
   record carrier means for supporting a record disc, said record carrier means being adapted to move between a first carrier position within said housing means and a second carrier position withdrawn from said housing means;
   cover means movably mounted on said record carrier means; and
   control means operative with said movement of said record carrier means for moving said cover means to a first cover position in blocking relation to said opening when said record carrier means is moved to said first carrier position, and to a second cover position out of said blocking relation with said opening when said record carrier means is moved to said second carrier position, said control means including arm means connected to said record carrier means and said cover means, biasing means for biasing said arm means to move said cover means to said first cover position, and cam means for controlling said arm means to move said cover means to said second cover position against the force of said biasing means when said record carrier means is moved to said second carrier position.

2. Record playing apparatus according to claim 1; in which said arm means is pivotally connected at one end thereof to said record carrier means and has a second, opposite end to which said cover means is connected, and said biasing means includes spring means for pivotally biasing said arm means to move said cover means to said first cover position in blocking relation to said opening.

3. Record playing apparatus comprising:
   housing means having an opening;
   record carrier means for supporting a record disc, said record carrier means being adapted to move between a first carrier position within said housing means and a second carrier position withdrawn from said housing means;
   cover means; and
   control means for moving said cover means to a first cover position in a blocking relation to said opening when said record carrier means is moved to said first carrier position, and to a second cover position out of said blocking relation with said opening when said record carrier means is moved to said second carrier position, said control means including arm means pivotally connected at one end thereof to said record carrier means and at a second, opposite end thereof to said cover means, biasing means for biasing said arm means to move said cover means to said first cover position and including spring means for pivotally biasing said arm means to move said cover means to said first cover position in blocking relation to said opening, cam means for controlling said arm means to move said cover means to said second cover position against the force of said biasing means when said record carrier means is moved to said second carrier position and including at least one cam bar secured to said housing means and having a slope which is inclined with respect to said record carrier means, and cam follower means connected to said arm means and guided by said cam means so that said arm means is controlled to move said cover means to said second position when said record carrier means is moved to said second carrier position.

4. Record playing apparatus according to claim 3; in which said cam follower means includes at least one guide roller connected to said arm means and which is guided by said at least one cam bar during movement of said record carrier means between said first carrier position and said second carrier position.

5. Record playing apparatus comprising:
   housing means having an opening;
   record carrier means for supporting a record disc, said record carrier means having a front end and being adapted to move between a first carrier position within said housing means and a second carrier position withdrawn from said housing means;
   cover means;
   control means for moving said cover means to a first cover position in a blocking relation to said opening when said record carrier means is moved to said first carrier position, and to a second cover position out of said blocking relation with said opening when said record carrier means is moved to said second carrier position; and
   a mounting frame connected to said front end and having a slot within which said cover means is positioned when said cover means is moved to said second cover position.

6. Record playing apparatus according to claim 5; further including switch means provided on an outer portion of said mounting frame for controlling said movement of said record carrier means.

7. Record playing apparatus comprising:
   housing means having an opening at the front thereof;
   record carrier means for supporting a record disc on the top thereof;
   means mounting said record carrier means in a lower portion of said housing means for movements relative to the latter between a first carrier position in which said record carrier means is contained in said housing means with a front portion of said record carrier means situated in a lower portion of said opening, and a second carrier position in which said record carrier means is at least partly withdrawn forwardly from said housing means through said opening;
   cover means located adjacent said front portion of the record carrier means;
   mounting means mounting said cover means on said record carrier means for said movements therewith and for movements relative to said record carrier means between a first cover position in which said cover means extends above said top of the record carrier means for closing the remainder of said opening above said lower portion of the latter with said record carrier means in said first carrier position, and a second cover position in which said cover means is disposed below said top of the record carrier means at said front portion of the latter for ease of access to said top of the record carrier means when exchanging a record disc thereon with said record carrier means in said second carrier position; and cover control means operative in response to said movements of the record carrier means for selectively disposing said cover means in said first and second cover positions when said record carrier means is in said first and second carrier positions, respectively.

8. Record playing apparatus according to claim 7; in which said cover means includes a cover plate which is substantially erect in both said first and second cover positions.

9. Record playing apparatus according to claim 8; in which said means mounting said record carrier means includes cooperative guiding means which direct said record carrier means substantially horizontally in said movements thereof between said first and second carrier positions, and said mounting means for the cover means directs said cover plate substantially vertically in said movements thereof between said first and second cover positions.

10. Record playing apparatus according to claim 9; in which said cover control means includes cam means and cam follower means fixed relative to said housing means and said cover plate, respectively, said cam means being engaged by said cam follower means and shaped to effect said substantially vertical movements of the cover plate relative to said record carrier means in response to movements of said cover plate which accompany said substantially horizontal movements of said record carrier means relative to said housing means.

11. Record playing apparatus according to claim 10; in which said mounting means for the cover means include arm means secured to said cover plate, and means movably connecting said arm means with said record carrier means to permit said substantially vertical movements of the arm means at said cover plate, and said cam follower means are mounted on said arm means.

12. Record playing apparatus according to claim 11; in which said arm means are elongated and have said cover plate secured to one end of said arm means, and said means movably connecting said arm means with said record carrier means are pivot means at an opposite end of said arm means so that said substantially vertical movements occur in an arcuate path.

13. Record playing apparatus according to claim 10; in which said cover control means further includes biasing means for urging said cover plate to one of said first and second cover positions.

14. Record playing apparatus according to claim 13; in which said cam means are bar-shaped and extend along the direction of said substantially horizontal movements of the record carrier means, said bar-shaped cam means having an inclined portion of effecting said substantially vertical movements upon the movement of said cam follower means along said inclined portions; and in which said biasing means acts in a direction urging said cam follower means into engagement with said bar-shaped cam means.

15. Record playing apparatus according to claim 14; in which said cam follower means is engageable with said bar-shaped cam means from below, and said biasing means urges said cam follower means upwardly for biasing said cover plate toward said first cover position.

16. Record playing apparatus according to claim 14; in which said mounting means for the cover means include elongated arm means secured at one end to said cover plate and pivot means pivotally connecting the other end of said arm means to said record carrier means so that said substantially vertical movements of the cover plate occur in an arcuate path, said cam follower means are mounted on said arm means, and said biasing means are connected between said arm means and said record carrier means.

17. Record playing apparatus according to claim 9; in which said record carrier means defines an upwardly opening slot in said front portion, and said cover plate nests in said slot when disposed in said second cover position.

18. Record playing apparatus according to claim 7; further comprising drive means for effecting said movements of the record carrier means between said first and second carrier positions.

19. Record playing apparatus according to claim 18; in which said drive means includes reversible electric drive motor means operative for effecting said movements of the record carrier means, and limit switch means operable at said first and second carrier positions for halting operation of said drive motor means.

* * * * *